United States Patent
Conner et al.

(10) Patent No.: US 6,458,473 B1
(45) Date of Patent: *Oct. 1, 2002

(54) DIFFUSION ALUMINIDE BOND COAT FOR A THERMAL BARRIER COATING SYSTEM AND METHOD THEREFOR

(75) Inventors: Jeffrey A. Conner, Hamilton, OH (US); Bangalore A. Nagaraj, West Chester, OH (US); Joseph A. Heaney, III, Middletown, OH (US); Nripendra N. Das, Middletown, OH (US); Patricia A. Zomcik, Cincinnati, OH (US); David J. Wortman, Hamilton, OH (US); David V. Rigney, Cincinnati, OH (US); Jon C. Schaeffer, Milford, OH (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/786,814

(22) Filed: Jan. 21, 1997

(51) Int. Cl.[7] .......................... B21D 39/00; C03C 27/02; C03C 27/08

(52) U.S. Cl. ....................... 428/623; 428/632; 428/640; 428/633

(58) Field of Search ............................... 428/632, 623, 428/640, 469, 701, 938, 941, 633; 416/241 R, 241 B

(56) References Cited

U.S. PATENT DOCUMENTS

| | | | |
|---|---|---|---|
| 3,677,789 A | 7/1972 | Bungardt et al. | 117/22 |
| 3,918,139 A | 11/1975 | Felten | 29/194 |
| 3,951,642 A | 4/1976 | Chang et al. | 75/0.5 R |
| 3,979,273 A | 9/1976 | Panzera et al. | 204/192 |
| 3,996,021 A | 12/1976 | Chang et al. | 29/194 |
| 4,070,507 A | 1/1978 | Stueber et al. | 427/252 |
| 4,071,638 A | 1/1978 | Chang et al. | 427/192 |
| 4,123,594 A | 10/1978 | Chang | 428/651 |
| 4,123,595 A | 10/1978 | Chang | 428/667 |
| 4,132,816 A | 1/1979 | Benden et al. | 427/237 |
| 4,352,840 A | 10/1982 | Sievers | 427/252 |
| 4,371,570 A | 2/1983 | Goebel et al. | 427/248.1 |
| 4,399,199 A | 8/1983 | McGill et al. | 428/633 |
| 4,501,776 A | 2/1985 | Shankar | 427/253 |
| 4,933,239 A | 6/1990 | Olson et al. | 428/557 |
| 4,933,329 A * | 6/1990 | Olson et al. | 428/557 |
| 5,238,752 A | 8/1993 | Duderstadt et al. | 428/623 |
| 5,427,866 A * | 6/1995 | Nagaraj et al. | 428/610 |
| 5,498,484 A * | 3/1996 | Duderstadt | 428/633 |
| 5,514,482 A | 5/1996 | Strangman | 428/623 |
| 5,624,721 A * | 4/1997 | Strangman | 427/585 |
| 5,645,893 A | 7/1997 | Rickerby et al. | 427/405 |
| 5,667,663 A * | 9/1997 | Rickerby et al. | 205/170 |
| 5,716,720 A * | 2/1998 | Murphy | 428/623 |
| 5,942,337 A | 8/1999 | Rickerby et al. | 428/623 |

FOREIGN PATENT DOCUMENTS

| | | | |
|---|---|---|---|
| EP | 718419 | * | 6/1996 |
| EP | 0 733 723 A1 | | 9/1996 |
| EP | 0 821 078 A1 | | 1/1998 |

* cited by examiner

*Primary Examiner*—Paul Thibodeau
*Assistant Examiner*—Holly C Rickman
(74) *Attorney, Agent, or Firm*—David L. Narciso; Gary M. Hartman; Domenica N. S. Hartman

(57) ABSTRACT

A thermal barrier coating system and a method for forming the coating system on a component designed for use in a hostile thermal environment, such as superalloy turbine, combustor and augmentor components of a gas turbine engine. The method is particularly directed to a thermal barrier coating system that includes a thermal insulating ceramic layer and a diffusion aluminide bond coat on which an aluminum oxide scale is grown to protect the underlying surface of the component and to chemically bond the ceramic layer. The bond coat is formed to contain an additive metal of platinum, palladium, rhodium, chromium and/or silicon, and an additive element of yttrium and/or zirconium, with possible additions of hafnium. The bond coat may be formed by codepositing aluminum with the active element, or by depositing the additive metal and active element on the surface of the component, and then aluminizing to form the diffusion aluminide bond coat.

18 Claims, 1 Drawing Sheet

DIFFUSION ALUMINIDE BOND COAT FOR A THERMAL BARRIER COATING SYSTEM AND METHOD THEREFOR

This invention relates to thermal barrier coating systems for components exposed to high temperatures, such as the hostile thermal environment of a gas turbine engine. More particularly, this invention is directed to a thermal barrier coating system which employs a ceramic layer and a diffusion aluminide bond coat incorporating an additive metal and an active element, which together promote the spallation resistance of the ceramic layer.

BACKGROUND OF THE INVENTION

The operating environment within a gas turbine engine is both thermally and chemically hostile. Significant advances in high temperature alloys have been achieved through the formulation of iron, nickel and cobalt-base superalloys, though components formed from such alloys often cannot withstand long service exposures if located in certain sections of a gas turbine engine, such as the turbine, combustor and augmentor. A common solution is to provide such components with an environmental coating that inhibits oxidation and hot corrosion.

Coating materials that have found wide use for this purpose include diffusion aluminide coatings, which are generally single-layer oxidation-resistant layers formed by diffusion processes, such as a pack cementation process. Diffusion processes generally entail reacting the surface of a component with an aluminum-containing gas composition to form two distinct zones, the outermost of which is an additive layer containing an environmentally-resistant intermetallic represented by MAl, where M is iron, nickel or cobalt, depending on the substrate material. Beneath the additive layer is a diffusion zone comprising various intermetallic and metastable phases that form during the coating reaction as a result of diffusional gradients and changes in elemental solubility in the local region of the substrate. During high temperature exposure in air, the MAl intermetallic forms a protective aluminum oxide (alumina) scale or layer that inhibits oxidation of the diffusion coating and the underlying substrate.

For particularly high temperature applications, environmental coating systems often include a layer of thermal insulating ceramic over a diffusion coating, the latter of which is then termed a bond coat. The combination of the bond coat and ceramic layer is known in the art as a thermal barrier coating system. Various ceramic materials have been employed as the ceramic layer, particularly zirconia ($ZrO_2$) fully or partially stabilized by yttria ($Y_2O_3$), magnesia (MgO), ceria ($CeO_2$), scandia ($Sc_2O_3$), or another oxide. These particular materials are widely employed in the art because they exhibit desirable thermal cycle fatigue properties, and also because they can be readily deposited by plasma spray, flame spray and vapor deposition techniques.

A bond coat is critical to the service life of the thermal barrier coating system in which it is employed, and is therefore also critical to the service life of the component protected by the coating system. The oxide scale formed by a diffusion aluminide bond coat is adherent and continuous, and therefore not only protects the bond coat and its underlying superalloy substrate by serving as an oxidation barrier, but also chemically bonds the ceramic layer. Nonetheless, aluminide bond coats inherently continue to oxidize over time at elevated temperatures, which gradually depletes aluminum from the bond coat and increases the thickness of the oxide scale until such time as the scale reaches a critical thickness that leads to spallation of the ceramic layer at the interface between the bond coat and the aluminum oxide scale. Once spallation has occurred, the component deteriorates rapidly, and must be refurbished or scrapped at considerable cost.

In addition to excessive oxide growth, the ability of the bond coat to form and maintain a suitable aluminum oxide scale can be hampered by the interdiffusion of aluminum in the bond coat with the superalloy substrate, and from the diffusion of elements from the superalloy into the bond coat, such as during formation of the aluminide bond coat or during high temperature exposure. The diffusion and subsequent oxidation of elements such as molybdenum, tungsten, rhenium, titanium and tantalum within the aluminide bond coat can become thermodynamically favored as the aluminum within the coating is depleted through oxidation and interdiffusion. Furthermore, these elements tend to form voluminous, nonadherent scales that are deleterious to adhesion of the ceramic layer.

From the above, it is apparent that the service life of a thermal barrier coating system, and therefore the component protected by the coating system, is dependent on the bond coat used to anchor the thermal insulating ceramic layer. The prior art has proposed aluminide environmental coatings whose environmental resistance is improved by additions of various elements, such as platinum group metals, as disclosed in U.S. Pat. Nos. 3,677,789, 4,352,840 and 4,933,239. While improvements in oxidation have been achieved with these coatings, the requirements for an aluminide bond coat can differ from that of an aluminide environmental coating, since a bond coat must not only exhibit environmental resistance but also promote adhesion of the ceramic layer. For example, while oxide growth on an aluminide environmental coating promotes the environmental protection provided by the coating to its underlying substrate, continuous oxide growth on an aluminide bond coat is detrimental to the spallation resistance of its overlying ceramic layer. While U.S. Pat. No. 5,514,482 to Strangman suggests that diffusion aluminide bond coats may be modified with platinum, silicon, hafnium and oxides to promote scale adhesion, the problem of excess scale growth is neither recognized nor solved. Therefore, it would be desirable if improvements could be achieved for the service life of a thermal barrier coating system through the use of an improved bond coat that exhibits slower oxide scale growth.

SUMMARY OF THE INVENTION

It is an object of this invention to provide an improved thermal barrier coating system and process for a component designed for use in a hostile thermal environment, such as superalloy components of a gas turbine engine.

It is another object of this invention that the coating system includes a diffusion aluminide bond coat that is formed on the surface of the component.

It is still another object of this invention that the coating system includes a thermal insulating ceramic layer that is anchored to the component with an aluminum oxide scale on the surface of the aluminide bond coat.

It is yet another object of this invention that the aluminide bond coat is modified to produce a relatively slow-growing oxide scale that is relatively free of impurities and resists cracking and spalling.

It is a further object of this invention that the aluminide bond coat includes an additive metal and an active element, which together yield a bond coat characterized by increased resistance to oxidation as a result of the slower growth rate for the oxide scale, and further characterized by improved adhesion of the oxide scale to the bond coat, such that the spallation resistance of the ceramic layer is also promoted.

The present invention generally provides a thermal barrier coating system and a method for forming the coating system on a component designed for use in a hostile thermal environment, such as superalloy turbine, combustor and augmentor components of a gas turbine engine. The method is particularly directed to a thermal barrier coating system that includes an oxidation-resistant diffusion aluminide bond coat on which an aluminum oxide scale is grown to protect the underlying surface of the component and adhere an overlying thermal-insulating ceramic layer.

According to this invention, significant improvements in spallation resistance for the ceramic layer are achieved by forming the aluminide bond coat to include one or more specific metal additives, namely the noble metals (platinum, palladium and rhodium), chromium and/or silicon, and limited additions of the active elements yttrium and/or zirconium. The additive metal and active element constituents of the bond coat may be deposited prior to the aluminide bond coat, such as by sputtering or through a cathodic arc process. Alternatively, the active element constituent may be simultaneously deposited with the aluminide bond coat using pack cementation or gas phase processing. Once formed, the modified aluminide bond coat undergoes oxidation to form an aluminum oxide scale that serves as an oxidation-resistant barrier layer and chemically bonds the thermal-insulating ceramic layer.

According to this invention, appropriately alloying the aluminide bond coat to contain one or more of the above-noted additive metals and one or more of the above-noted active elements serves to significantly enhance the spallation resistance of the overlying ceramic layer by promoting the adherence of the aluminum oxide scale and slowing the growth of the oxide scale. The active elements improve oxide scale adhesion by altering the structure of the oxide, bond coat and oxide-bond coat interface and/or by tying up tramp elements such as sulfur. The additive metals generally promote the selective oxidation of aluminum at lower concentrations of aluminum in the bond coat. Furthermore, the noble metals impede the diffusion of refractory metals from the substrate so as to prevent their oxides from doping the oxide scale. Additive elements such as silicon and chromium react with refractory metals to form compounds that tie up the refractory metals, thereby preventing the formation of refractory metal oxides at the surface of the aluminide bond coat. As such, the additive metals provide advantages that are particularly notable where the component is a superalloy containing one or more refractory metals, such as tantalum, tungsten, molybdenum, titanium and rhenium. A synergistic effect appears to result due to the presence of both the additive and active elements, yielding a significantly slower oxide growth rate. Because stresses rise and adhesion declines as oxide scale thickness increases, the ultimate result being spallation, the slowed oxide growth rate provided by this invention is able to significantly extend the life of a thermal barrier coating system.

Other objects and advantages of this invention will be better appreciated from the following detailed description.

BRIEF DESCRIPTION OF THE DRAWINGS

The present invention will now be described, by way of example, with reference to the accompanying drawings, in which.

DETAILED DESCRIPTION OF THE INVENTION

Figure 1:
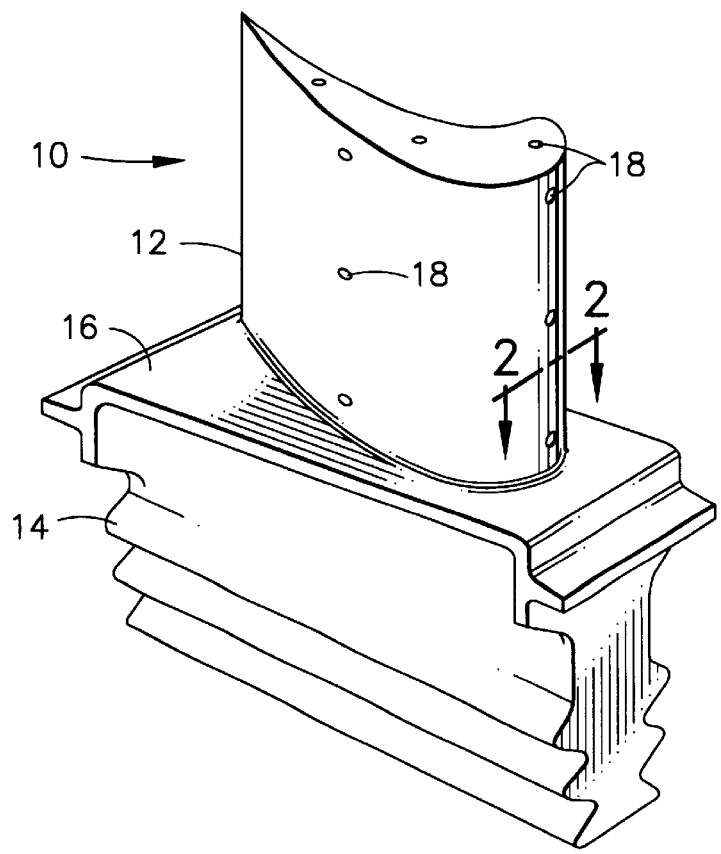
FIG. 1 is a perspective view of a high pressure turbine blade.

The present invention is generally applicable to components that operate within environments characterized by relatively high temperatures, and are therefore subjected to a hostile oxidizing environment and severe thermal stresses and thermal cycling. Notable examples of such components include the high and low pressure turbine nozzles and blades, shrouds, combustor liners and augmentor hardware of gas turbine engines. An example of a high pressure turbine blade 10 is shown in FIG. 1. The blade 10 generally includes an airfoil 12 and platform 16 against which hot combustion gases are directed during operation of the gas turbine engine, and whose surfaces are therefore subjected to severe attack by oxidation, corrosion and erosion. The airfoil 12 and platform 16 are anchored to a turbine disk (not shown) with a dovetail 14 formed on a shank section of the blade 10. Cooling passages 18 are present through the airfoil 12 through which bleed air is forced to transfer heat from the blade 10. While the advantages of this invention will be described with reference to the high pressure turbine blade 10 shown in FIG. 1, the teachings of this invention are generally applicable to any component on which a thermal barrier coating system may be used to protect the component from its environment.

Figure 2:
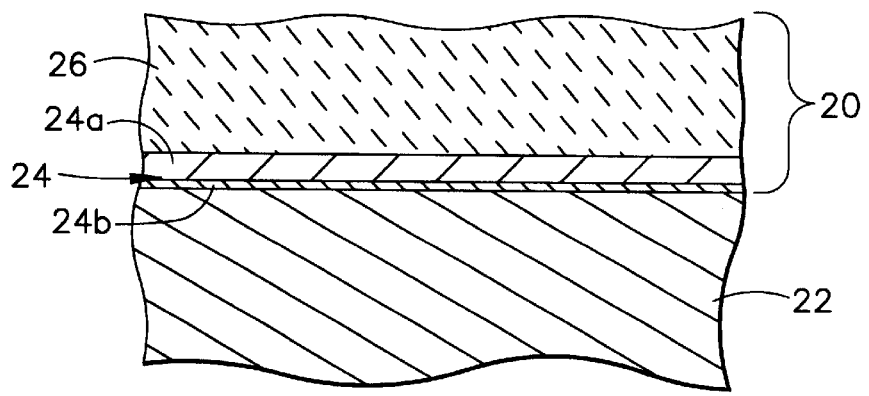
FIG. 2 is a cross-sectional view of the blade of FIG. 1 along line 2—2, and shows a thermal barrier coating system on the blade in accordance with this invention.

Represented in FIG. 2 is a thermal barrier coating system 20 in accordance with this invention. As shown, the coating system 20 includes a ceramic layer 26 and a diffusion aluminide bond coat 24 overlying a substrate 22, which is typically the base material of the blade 10. Suitable materials for the substrate 22 (and therefore the blade 10) include nickel, iron and cobalt-base superalloys, with the invention being particularly advantageous with nickel-base superalloys that contain one or more refractory metals, such as molybdenum, tungsten, rhenium, titanium and tantalum. The aluminide bond coat 24 is generally characterized by an additive layer 24a that overlies a diffusion zone 24b, the former of which is usually a monoaluminide layer of an oxidation-resistant MAl intermetallic phase, such as the nickel-aluminide beta phase (NiAl). Coatings of this type form an aluminum oxide scale (not shown) on the surface of the additive layer during exposure to engine environments. The oxide scale inhibits oxidation of the bond coat 24 and substrate 22, and chemically bonds the ceramic layer 26 to the bond coat 24. A suitable thickness for the bond coat 24 is about 25 to about 150 micrometers.

The ceramic layer 26 overlying the aluminide bond coat 24 is required for high temperature components (such as the blade 10) of gas turbine engines. As noted above, the ceramic layer 26 is chemically bonded to the oxide scale on the surface of the aluminide bond coat 24. A preferred ceramic layer 26 has a strain-tolerant columnar grain structure achieved by physical vapor deposition (PVD) techniques known in the art, e.g., electron beam physical vapor deposition (EBPVD), though ceramic layers are also formed by air plasma spray (APS) techniques. A suitable material for the ceramic layer 26 is zirconia that is partially or fully stabilized with yttria (YSZ), though other ceramic materials could be used, including yttria or zirconia stabilized by magnesia, ceria, scandia or another oxide. The ceramic layer 26 is deposited to a thickness that is sufficient to provide the required thermal protection for the underlying substrate 22 and blade 10, generally on the order of about 75 to about 300 micrometers.

According to this invention, the bond coat 24 includes additions of certain metals and active elements to promote the spallation resistance of the ceramic layer 26. Metal additives employed by this invention are chromium, silicon and/or a noble metal such as platinum, rhodium and palladium, which help selectively oxidize aluminum at lower concentrations. The active elements are yttrium and zirconium, with possible additions of hafnium. The bond coat 24 can be codeposited with the active element constituent, or diffused into a predeposited layer of the metal additive and active element. According to this invention, the addition of these constituents to a diffusion aluminide bond coat has been found to slow the oxide scale growth rate, in addition to forming stable oxides, trapping or tying up deleterious tramp elements such as sulfur, and promoting adhesion of the oxide scale on the bond coat 24, all of which promotes the spallation resistance of the ceramic layer 26. The preferred additive metals are selected on the basis of their ability to enhance the environmental resistance (i.e., oxidation and hot corrosion resistance) of the bond coat 24 and promote the selective oxidation of aluminum, while the active elements improve oxide scale adhesion by mechanisms such as oxide pegging and/or gettering of tramp elements such as sulfur. These additions may also impede the diffusion of elements from the substrate 22, and therefore render the bond coat 24 less susceptible to interactions and interdiffusion of elements observed between prior art bond coats and their superalloy substrates.

Importantly, a synergistic effect appears to occur as a result of the presence of both the additive metal and active elements. Thermal barrier coating systems according to this invention have exhibited thermal cycle resistance of about 2.5 times better than prior art coating systems with platinum aluminide bond coats, and about six times better than prior art coating systems with aluminide bond coats. To achieve the advantages of this invention, the additive metals are present in amounts of about 5 to about 50 weight percent, while the active elements are preferably present in amounts of about 10 parts per million (ppm) to about 1.0 weight percent yttrium and/or about 0.01 to about 5.0 weight percent zirconium, with possible additions of about 0.01 to about 5.0 weigh percent hafnium.

Certain combinations of the metal additives, active elements and aluminum can be codeposited and diffused into the substrate 22 using suitable techniques. For example, aluminum and the active element can be codeposited and simultaneously diffused into the substrate 22 using a suitable aluminizing technique, such as pack cementation and out-of-pack (gas or vapor phase deposition) processes. In addition, one or more noble metals and the active elements can be applied simultaneously by sputtering or cathodic arc processes, each of which involves vaporizing and then condensing the desired elements on the substrate 22. Alternatively, aluminum and the active elements can be simultaneously applied by chemical vapor deposition (CVD) techniques, and aluminum and chromium can be codeposited by pack cementation and out-of-pack processes. Additive metals such as platinum and rhodium can be individually deposited by electroplating. Examples of the above would be to sputter or plate platinum, and then aluminiding with yttrium or sputtering yttrium followed by aluminiding. In the latter example, yttrium could be sputtered prior to deposition of platinum. It is also within the scope of this invention that the active element constituent of the bond coat 24 can be provided by the underlying superalloy 22, whose composition would be modified to achieve the desired active element content for the bond coat 24.

Sputtering and cathodic arc coating techniques have the advantage over prior art techniques of being able to repeatably deposit specific alloy combinations. Deposition by either method can be carried out using a pre-alloyed target cathode material, such as alloy sheet, powder, etc., whose composition conforms to the desired combination of metal additive and active element. Alternatively, multiple targets of substantially pure constituents for the additive metal and active element could be formed, which are then simultaneously vaporized and deposited to form a homogeneous coating, or sequentially vaporized and deposited to form a multilayered coating. In the latter case, subsequent heat treatment or exposure to high service temperatures serves to interdiffuse the materials to form the modified composition for the bond coat 24. Following deposition of the additive metal and active element, the surface of the component is then aluminized by any suitable method to form the aluminide bond coat 24.

According to this invention, the selective additions of the additive metal in combination with the active elements are able to significantly enhance the spallation resistance of the ceramic layer 26, and therefore the service life of the component protected by the thermal barrier coating system 20. These selective additions promote the environmental resistance of the bond coat 24 while also slowing the growth of the oxide scale on the bond coat 24 and promoting a more adherent and stable oxide scale, such that the ceramic layer 26 is more adherent to the bond coat 24. The bond coat 24 may also be rendered more resistant to the diffusion of substrate constituents into the bond coat 24. Most notable are the refractory metals tantalum, tungsten, molybdenum, titanium and rhenium, which form less desirable oxides that can detrimentally affect the desired aluminum oxide scale on the bond coat 24.

During the investigation of this invention, nickel-base superalloy specimens were coated with thermal barrier coating systems whose bond coats were either prior art diffusion aluminides or formed in accordance with this invention. Specifically, specimens were formed of the nickel-base superalloy Renè N5, disclosed in copending U.S. patent application Ser. No. 08/270,528 now U.S. Pat No. 6,074, 602, and assigned to the assignee of this invention. This superalloy nominally contains, in weight percent, about 7.5% cobalt, about 7% chromium, about 1.5% molybdenum, about 5% tungsten, about 3% rhenium, about 6.5% tantalum, about 6.2% aluminum, about 0.15% hafnium, about 0.05% carbon, about 0.01% yttrium, and about 0.004% boron, with the balance nickel and incidental impurities. Bond coats formed in accordance with this invention were diffusion aluminides containing additions of about 20 to 40 weight percent platinum and about 0.01 to 0.1 weight percent yttrium. In contrast, prior art bond coats evaluated were diffusion aluminides formed by pack cementation, gas or vapor, and tape diffusion processes. One group of prior art bond coats further included platinum to yield platinum-modified aluminide coatings.

Results of furnace cycle testing at about 1135° C. (about 2075° F.) resulted in the bond coats of this invention achieving an average thermal cycle resistance of about 2.5 times better than the prior art coating systems with platinum aluminide bond coats, and about six times better than the prior art coating systems with aluminide bond coats. Such results evidence the remarkably improved spallation resistance of thermal barrier coating systems of this invention as compared to prior art coating systems. Based on testing that has shown a relationship between alumina scale thickness and spallation, the increased time to spallation for the specimens prepared in accordance with this invention was attributed to a combination of decreased oxide growth rate and improved scale adherence afforded by this invention.

While the invention has been described in terms of a preferred embodiment, it is apparent that other forms could be adopted by one skilled in the art. Accordingly, the scope of the invention is to be limited only by the following claims.

What is claimed is:

1. A component having a thermal barrier coating system on a surface thereof that is formed by a superalloy substrate, the coating system comprising:

an aluminide bond coat at the surface of the component, the bond coat comprising platinum, about 0.01 to about 5.0 weight percent zirconium, and about 10 ppm to about 1.0 weight percent yttrium;

an aluminum oxide layer on the bond coat; and a ceramic layer chemically bonded to the bond coat by the aluminum oxide layer.

2. A component having a thermal barrier coating system on a surface thereof, the component being formed of a superalloy containing yttrium, the coating system comprising:

a platinum aluminide bond coat on the surface of the component, the bond coat containing about 10 ppm to about 1.0 weight percent yttrium, about 0.01 to about 5.0 weight percent zirconium, and about 5 to about 50 weight percent platinum;

an aluminum oxide layer on the bond coat; and a ceramic layer chemically bonded to the bond coat by the aluminum oxide layer.

3. A component as recited in claim 1, wherein the bond coat contains about 5 to about 50 weight percent platinum.

4. A component as recited in claim 1, wherein the bond coat further comprises at least one additive metal chosen from the group consisting of palladium, rhodium, silicon and chromium.

5. A component as recited in claim 1, wherein the ceramic layer has a columnar grain structure as a result of being formed by an EBPVD technique.

6. A method for forming a thermal barrier coating system on a component, the component having a surface formed of a superalloy, the method comprising the steps of:

forming an aluminide bond coat at the surface of the component by a process in which platinum and yttrium are deposited on the component such that the bond coat contains aluminide intermetallics, platinum, about 0.01 to about 5.0 weight percent zirconium, and about 10 ppm to about 1.0 weight percent yttrium;

forming an aluminum oxide layer on the bond coat; and forming a ceramic layer on the aluminum oxide layer so as to be chemically bonded to the bond coat by the aluminum oxide layer.

7. A method as recited in claim 6, wherein the component is formed of a superalloy containing yttrium.

8. A method as recited in claim 6, wherein the bond coat contains about 5 to about 50 weight percent platinum.

9. A method as recited in claim 6, wherein the bond coat further comprises about 0.01 to about 5.0 weight percent hafnium.

10. A method as recited in claim 6, wherein the bond coat further comprises at least one additive metal chosen from the group consisting of palladium, rhodium, silicon and chromium.

11. A method as recited in claim 10, wherein the bond coat comprises platinum aluminide intermetallic phases.

12. A method as recited in claim 6, wherein the ceramic layer is formed by an EBPVD technique so as to have a columnar grain structure.

13. A method as recited in claim 6, wherein the step of forming the bond coat entails codepositing aluminum and yttriun on the surface of the component by a diffusion process.

14. A method as recited in claim 13, wherein the diffusion process is a pack cementation process.

15. A method as recited in claim 13, wherein the diffusion process is a gas or vapor phase process.

16. A method as recited in claim 6, wherein the step of forming the bond coat entails predepositing platinum yttrium on the surface of the component, and then aluminiding the surface of the component.

17. A method as recited in claim 16, wherein the step of forming the bond coat entails providing platinum and yttrium as multiple targets that are simultaneously or sequentially vaporized.

18. A method as recited in claim 6, wherein the step of forming the bond coat entails individually depositing platinum and yttrium on the surface of the component, and then heat treating the component so as to interdiffuse the platinum and yttrium.

* * * * *